(12) United States Patent
Hutchinson et al.

(10) Patent No.: US 9,067,516 B2
(45) Date of Patent: Jun. 30, 2015

(54) CHILD SAFETY SEAT

(75) Inventors: James M. F. Hutchinson, Mohnton, PA (US); Kyle S. Mason, Reading, PA (US)

(73) Assignee: BP Children's Products HK Co., Limited, Hong Kong (HK)

(*) Notice: Subject to any disclaimer, the term of this patent is extended or adjusted under 35 U.S.C. 154(b) by 410 days.

(21) Appl. No.: 13/489,554

(22) Filed: Jun. 6, 2012

(65) Prior Publication Data
US 2012/0313413 A1 Dec. 13, 2012

Related U.S. Application Data

(60) Provisional application No. 61/520,242, filed on Jun. 7, 2011.

(51) Int. Cl.
*B60N 2/28* (2006.01)

(52) U.S. Cl.
CPC ............ *B60N 2/2821* (2013.01); *B60N 2/2812* (2013.01); *B60N 2/2851* (2013.01); *B60N 2/2872* (2013.01); *B60N 2/2875* (2013.01)

(58) Field of Classification Search
CPC .. B60N 2/2851; B60N 2/2812; B60N 2/2821; B60N 2/2872; B60N 2/2875
USPC .......................................... 297/250.1, 219.12
See application file for complete search history.

(56) References Cited

U.S. PATENT DOCUMENTS

| | | | |
|---|---|---|---|
| 6,030,047 A | 2/2000 | Kain | |
| 6,464,294 B1 * | 10/2002 | Kain | 297/250.1 X |
| 8,342,604 B2 * | 1/2013 | Heisey et al. | 297/250.1 X |
| 8,550,567 B2 * | 10/2013 | Biaud | 297/250.1 X |
| 2010/0253120 A1 | 10/2010 | Heisey et al. | |
| 2010/0308631 A1 | 12/2010 | Biaud | |

FOREIGN PATENT DOCUMENTS

| | | |
|---|---|---|
| AU | 2010224309 A1 | 3/2011 |
| CN | 1263834 A | 8/2000 |
| CN | 2630034 Y | 8/2004 |
| CN | 2640823 Y | 9/2004 |
| CN | 101010219 A | 8/2007 |
| CN | 201300753 Y | 6/2008 |
| CN | 201264544 Y | 7/2009 |
| CN | 201276037 Y | 7/2009 |
| EP | 1006017 A2 | 6/2000 |
| EP | 1813469 A1 | 8/2007 |
| EP | 2208637 A1 | 7/2010 |
| ES | 1071375 | 11/2009 |
| KR | 10-2010-0030412 | 3/2011 |
| KR | 10-2011-0031412 | 3/2011 |
| WO | 2010088248 A1 | 8/2010 |

* cited by examiner

*Primary Examiner* — Anthony D Barfield
(74) *Attorney, Agent, or Firm* — David I. Roche; Baker & McKenzie LLP (57) ABSTRACT

A child safety seat includes a seat shell having a backrest portion, a headrest adjustable along a front surface of the backrest portion, a shoulder strap, and a panel assembled at the front surface. The shoulder strap is formed from a webbing material that passes through the front surface and extends at a front side of the backrest portion. The panel can cover a region of the backrest portion that becomes uncovered by the headrest at the front surface as a result of the headrest being adjusted downward. Moreover, the seat can include a transversal bar affixed with the backrest portion, and a latch located below the transversal bar. The latch has a locking structure operable to engage with the backrest portion to hold the headrest in place, the latch being assembled with the headrest about a pivot axis located between the transversal bar and the locking structure.

24 Claims, 13 Drawing Sheets

CHILD SAFETY SEAT

CROSS-REFERENCE TO RELATED APPLICATION(S)

This patent application claims priority to U.S. Provisional Patent Application No. 61/520,242 filed on Jun. 7, 2011.

BACKGROUND

1. Field of the Invention

The present inventions relate to child safety seats having an adjustable headrest.

2. Description of the Related Art

Conventionally, an automobile vehicle has seatbelts provided at the front and rear seats. The seatbelt includes shoulder and waist straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which has a separate harness to restrain movements of the child.

For providing a comfortable sitting environment, the child safety seat may have a headrest that is adjustable relative to the backrest portion of the seat in accordance with the age and size of the child. However, during adjustment, the headrest may uncover and expose certain structural features of the backrest portion, such as slots through which the shoulder straps of the child safety seat is routed. These exposed features may be detrimental to the outer appearance of the seat, and also raise safety concerns, e.g., fingers may be inadvertently clipped through the exposed portions of the shoulder strap slots.

Therefore, there is a need for a child safety seat that can permit convenient adjustment of the headrest, and overcome at least the foregoing issues.

SUMMARY

The present application describes a child safety seat including a seat shell having a backrest portion, a headrest adjustable along a front surface of the backrest portion, a shoulder strap, and a panel assembled at the front surface of the backrest portion. The shoulder strap is formed from a webbing material that passes through the front surface and extends at a front side of the backrest portion. The panel can cover a region of the backrest portion that becomes uncovered by the headrest at the front surface as a result of the headrest being adjusted downward. Moreover, the seat can include a transversal bar affixed with the backrest portion, and a latch located below the transversal bar. The latch has a locking structure operable to engage with the backrest portion to hold the headrest in place, the latch being assembled with the headrest about a pivot axis located between the transversal bar and the locking structure.

In other embodiments, the child safety seat includes a seat shell having a backrest portion, and a headrest adjustable along a front surface of the backrest portion. The backrest portion has a slot opened on the front surface, and a transversal bar affixed with the backrest portion. A latch is assembled with the headrest vertically below the transversal bar, wherein the latch has a locking structure operable to engage with the backrest portion to hold the headrest in place, and the latch is assembled with the headrest about a pivot axis that is located between the transversal bar and the locking structure.

DETAILED DESCRIPTION OF THE EMBODIMENTS

Figure 1:
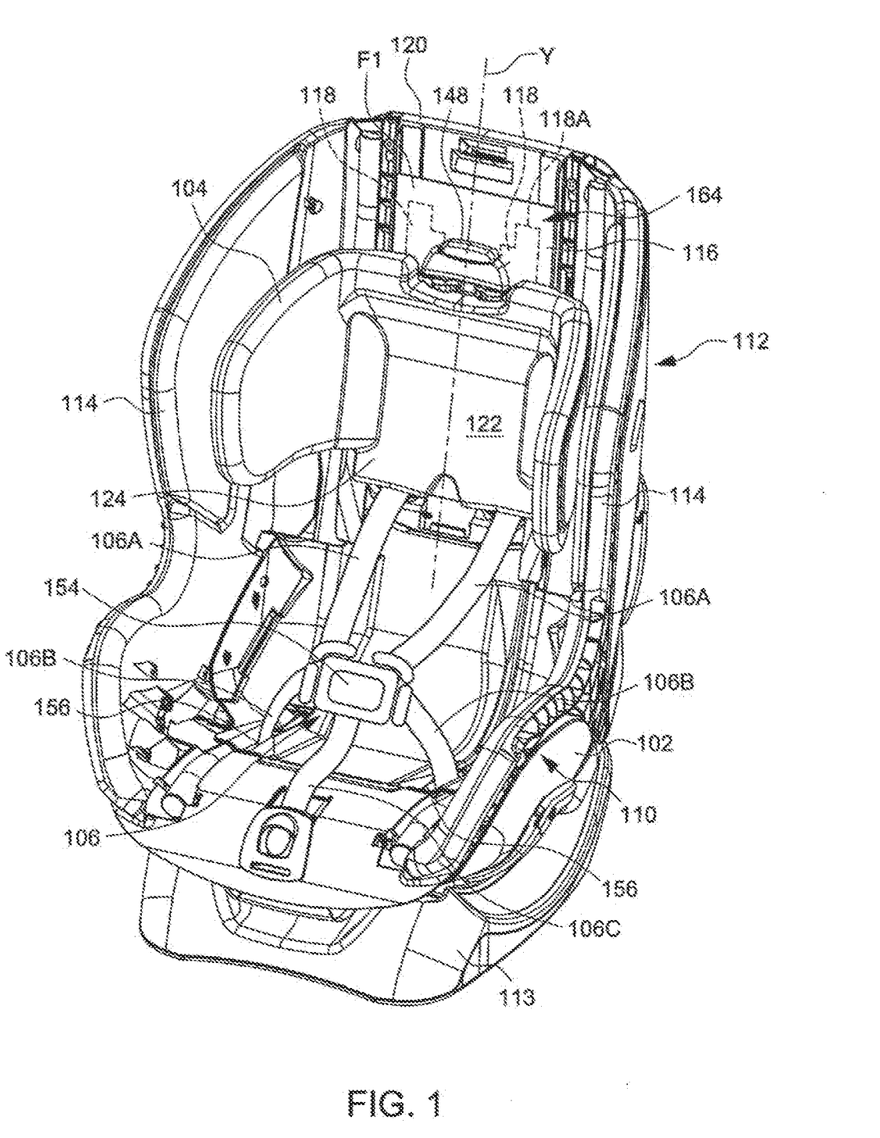
FIG. 1 is a schematic view illustrating one embodiment of a child safety seat.

FIG. 1 is a schematic view illustrating one embodiment of a child safety seat 100. The child safety seat 100 can include a seat shell 102, a headrest 104, and a restraint harness 106. The seat shell 102 can be formed by plastic molding, and includes a seat portion 110 and a backrest portion 112. Left and right sides of the seat shell 102 can respectively include raised flanks 114 to provide lateral protection. The backrest portion 112 can have a front surface 116, and two slots 118 (shown with dotted lines) opened on the front surface 116 for passage of shoulder straps 106A of the restraint harness 106. The slots 118 can be spaced apart from each other along a width of the backrest portion 112, and have parallel elongated shapes that extend vertically below a top end 120 of the backrest portion 112. In some embodiments, the seat shell 102 may also be used with a base 113 that can provide support for the seat shell 102. The seat shell 102 may move relative to the base 113 for recline adjustment.

The headrest 104 can be assembled with the seat shell 102 so as to be adjustable along a lengthwise axis Y on the front surface 116 of the backrest portion 112. In one embodiment, the headrest 104 can include a head support 122, and a bracket structure 124 located below the head support 122 and protruding at a rear of the headrest 104. The head support 122 can have a shape designed to provide comfortable resting support for a child's head. The bracket structure 124 can be mounted through the backrest portion 112, and receive the assembly of a latch 126 (better shown in FIG. 2) that is operable to engage with the backrest portion 112 to lock the headrest 104 with the backrest portion 112.

Figure 2:
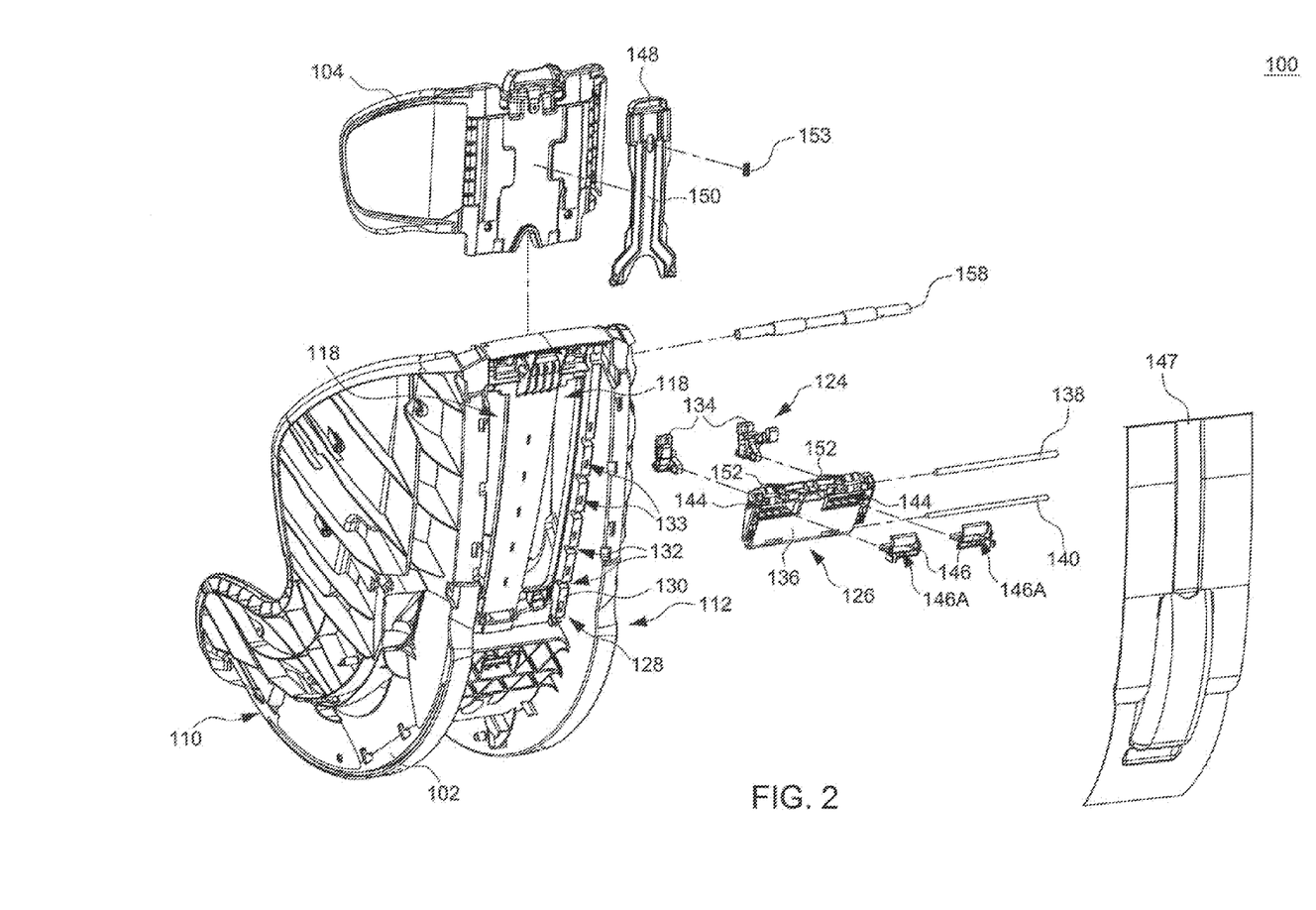
FIG. 2 is an exploded view illustrating the assembly of a latch and a headrest with a seat shell of the child safety seat shown in FIG. 1.
Figure 3:
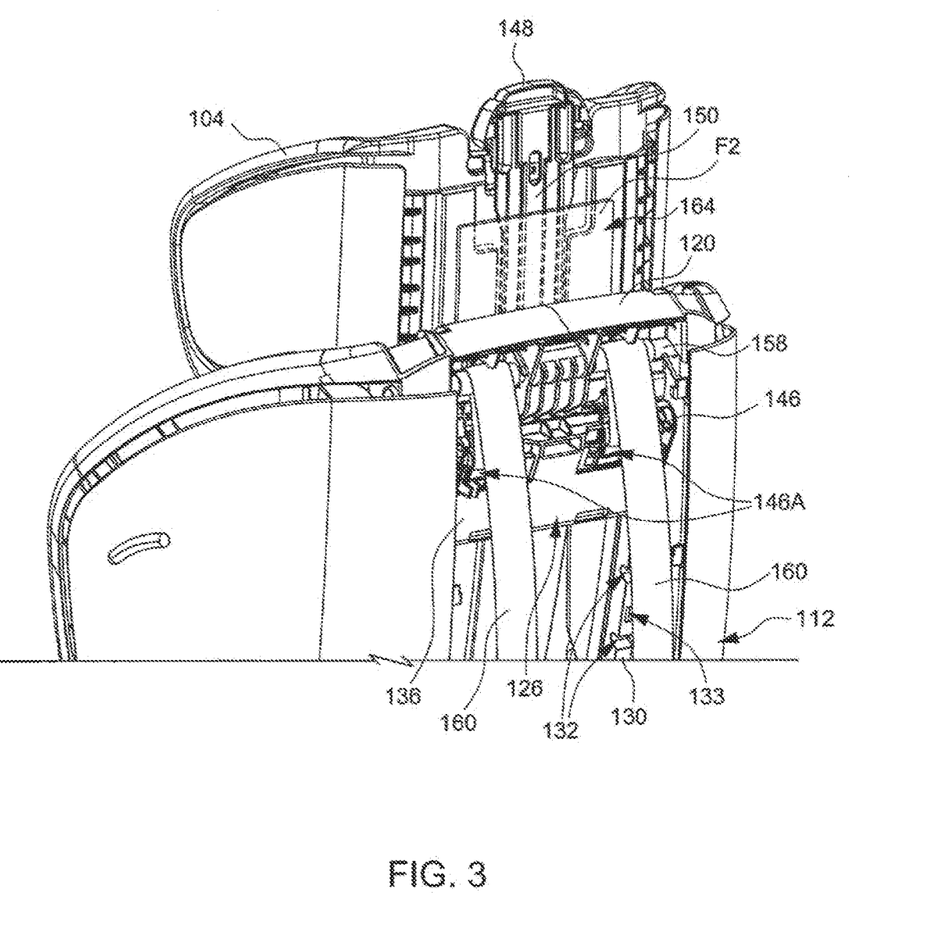
FIG. 3 is a schematic view showing the headrest and the latch assembled with the backrest portion of the child safety seat.
Figure 4:
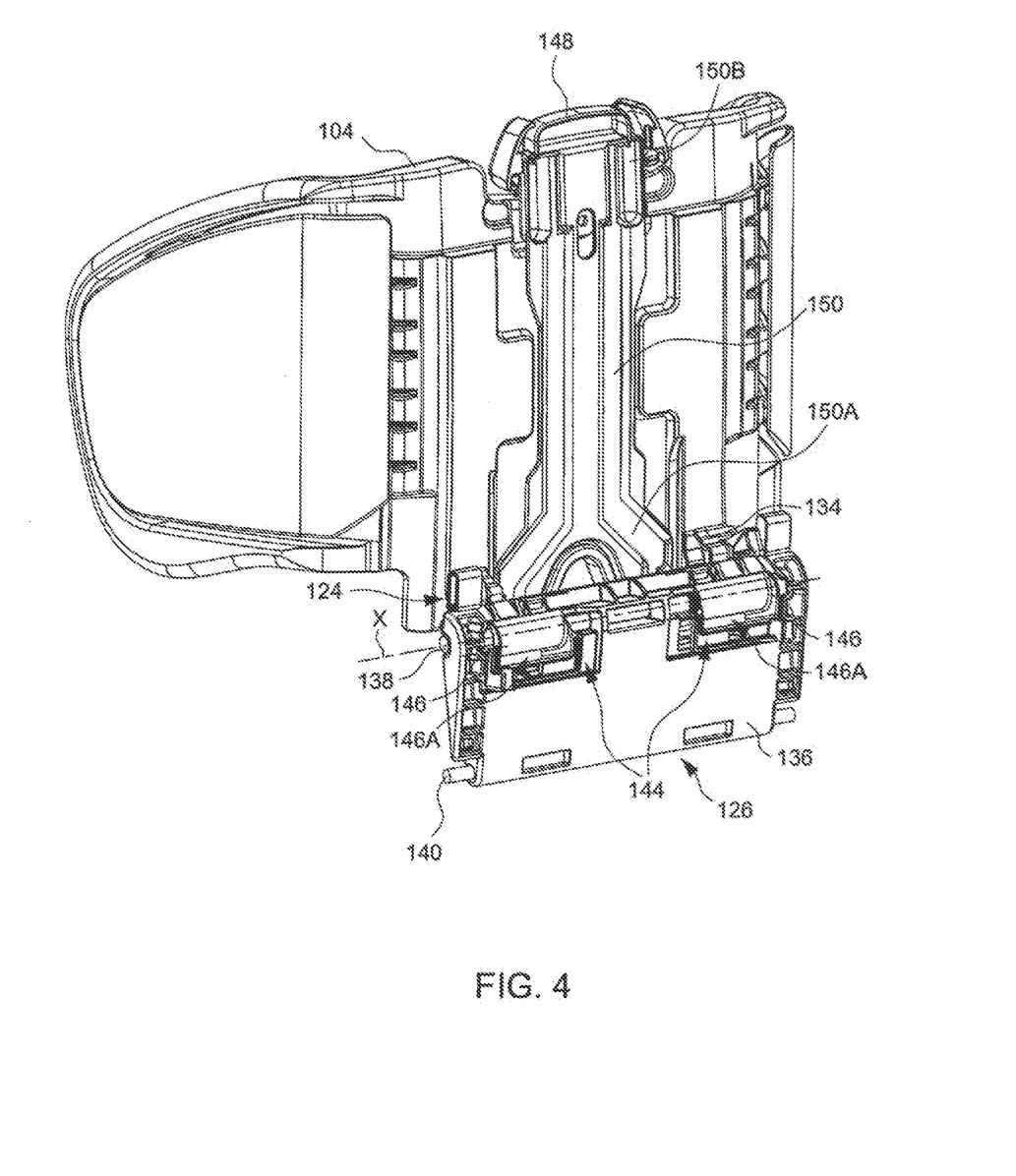
FIG. 4 is a schematic view illustrating the latch assembled with the headrest.
Figure 5:
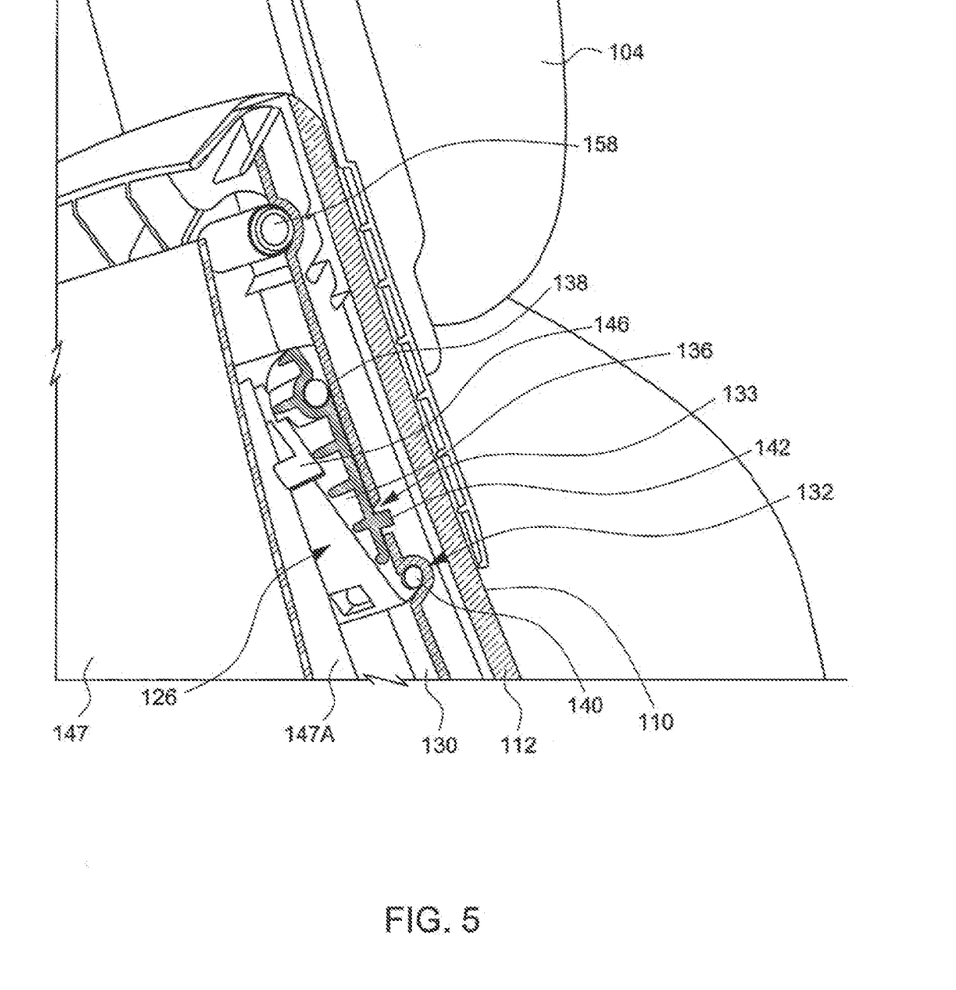
FIG. 5 is a partial cross-sectional view illustrating the assembly of the latch and the headrest with the seat shell.

FIG. 2 is an exploded view illustrating the assembly of the latch 126 and the headrest 104 with the seat shell 102 (for clarity some outer rigid panels of the seat shell 102 are omitted in FIG. 2), FIG. 3 is a schematic view showing the headrest 104 and the latch 126 assembled with the backrest portion 112, FIG. 4 is a schematic view illustrating the latch 126 assembled with the headrest 104, and FIG. 5 is a partial cross-sectional view illustrating the assembly of the latch 126 and the headrest 104 with the seat shell 102. The backrest portion 112 of the seat shell 102 can include a rack 128 extending along the axis Y of movement of the headrest 104. The rack 128 can include two parallel ridges 130 that are provided with grooves 132 that are distributed vertically and aligned in pairs on the two ridges 130. Each of the ridges 130 can also include a plurality of apertures 133 disposed alternately with respect to the grooves 132, i.e., the apertures 133 and grooves 132 alternate with one another along each ridge 130. The rack 128 can form a holding structure with which the latch 126 can engage for holding the headrest 104 in place relative to the backrest portion 112.

As better shown in FIGS. 2 and 4, the bracket structure 124 provided on the headrest 104 can include left and right arms 134 transversally spaced apart from each other. The bracket structure 124 can be constructed to receive the assembly of the latch 126.

The latch 126 can include a plate 136, and a shaft 138 and locking structure 140 affixed with the plate 136. The shaft 138 can be pivotally assembled with the arms 134 of the bracket structure 124 so as to define a pivot axis X (better shown in FIG. 4) about which the latch 126 (including the plate 136 and the locking structure 140) can rotate relative to the headrest 104. In one embodiment, the locking structure 140 can be formed as a shaft, and can be sized so as to be able to engage with any of the grooves 132 for locking the headrest 104 with the backrest portion 112 of the seat shell 102.

Referring to FIG. 5, one or more down catch finger 142 can protrude from an inner side of the latch 126 at a location between the shaft 138 and the locking structure 140. The down catch finger 142 may be fixedly connected or formed with the plate 136. When the latch 126 rotates relative to the pivot axis X, the down catch finger 142 can engage with and disengage from any of the apertures 133. In one embodiment, when the headrest 104 is adjusted to a desired position relative to the seat shell 102, the engagement of the down catch finger 142 with any of the apertures 133 can further assist to block downward displacement of the headrest 104.

Referring again to FIGS. 2-4, the plate 136 can also include two slits 144 transversally spaced apart from each other through which the shoulder straps 106A can be routed and traverse the latch 126. The slits 144 can be located between the shaft 138 and the locking structure 140. To ensure suitable positioning of the shoulder straps 106A at different heights of the headrest 104, two adjusting parts 146 may be assembled with the plate 136 respectively adjacent to the slits 144. Each adjusting part 146 can be provided with an opening 146A that is aligned with the slits 144 through which the webbing material of one associated shoulder strap 106A can be routed. The adjusting parts 146 can be assembled with the latch 126 for transversal sliding movements relative to the backrest portion 112. The adjusting parts 146 can also be respectively assembled in contact with two spaced-apart guiding rails 147A (better shown in FIG. 6) protruding from a rear cover panel 147 which externally closes the rear of the backrest portion 112.

Figure 6:
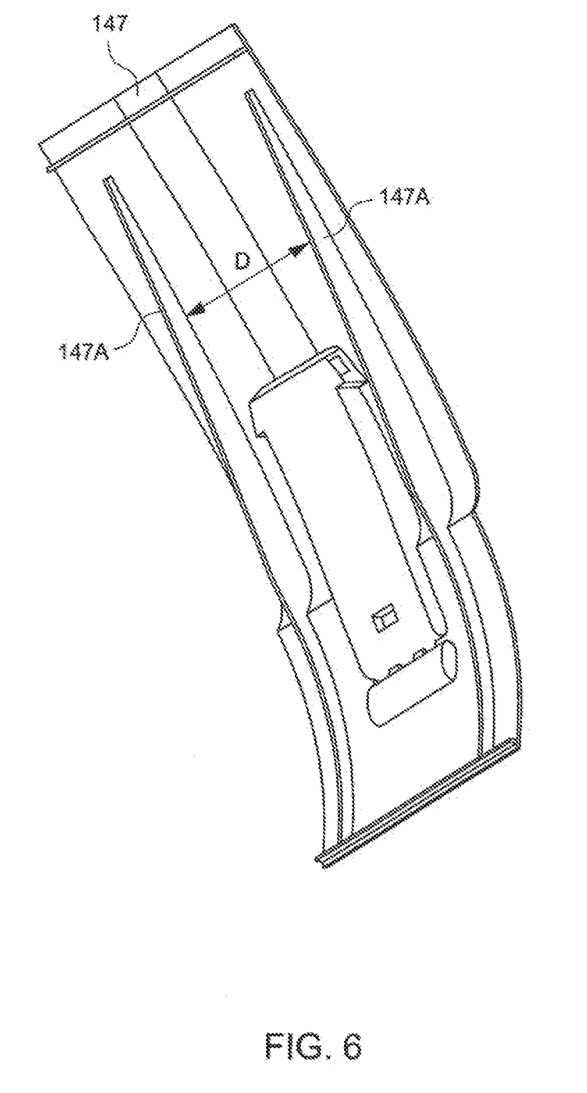
FIG. 6 is a schematic view showing an inner side of a cover panel that closes a rear of the backrest portion of the seat shell.

FIG. 6 is a schematic view showing an inner side of the cover panel 147. The guiding rails 147A can extend along a lengthwise axis of the backrest portion 112, and the distance D between the guiding rails 147A can progressively increase toward the top end of the backrest portion 112.

When the headrest 104 is assembled with the backrest portion 112 of the seat shell 102, the bracket structure 124 can extend through an interior of the backrest portion 112 via the slots 118, and the latch 126 can be pivotally assembled with the bracket structure 124 of the headrest 104 so as to lie adjacent to the rack 128 behind the front surface 116 of the backrest portion 112. The rear cover panel 147 then can be affixed with the seat shell 102 to cover at least partially the rear of the backrest portion 112, the rack 128, the latch 126 and the adjusting parts 146. After installation of the rear cover panel 147, the adjusting parts 146 movably assembled with the latch 126 can be in sliding contact with the guiding rails 147A of the rear cover panel 147. The latch 126 can engage with the rack 128 to lock the headrest 104 at one of the multiple heights relative to the backrest portion 112.

For turning the latch 126 to an unlocking state, the headrest 104 can be provided with a release mechanism including a release button 148 operatively connected with the latch 126. In one embodiment, the release button 148 can be disposed adjacent to a top end of the headrest 104. As shown in FIGS. 2-4, an actuator stem 150 having an elongated shape can be movably assembled with the headrest 104, and have lower and upper ends 150A and 150B respectively connected with the latch 126 and the release button 148. The lower end 150A of the actuator stem 150 can be exemplary assembled with the latch 126 via a pivot connection 152 located on the latch 126 eccentric from the axis X. The pivot connections 152 can respectively extend through the two slots 118 to assemble with the lower end 150A of the actuator stem 150. In the illustrated embodiment, the actuator stem 150 can be formed integral with the release button 148 with the lower end 150A thereof being pivotally connected with the latch 126. In other embodiments, the upper end 150B of the actuator stem 150 can be fixedly connected with the release button 148. Once it is assembled, the actuator stem 150 can extend along the backrest portion 112 between the ridges 130, and can be covered by a rear cover panel of the headrest 104.

A spring 153 can be connected between the backrest portion 112 and the actuator stem 150. The spring 153 can bias the actuator stem 150 upward so as to urge the latch 126 to engage with the rack 128.

When the release button 148 is depressed, the actuator stem 150 can move downward to compress the spring 153, which drives the latch 126 to rotate about the pivot axis X relative to the headrest 104 for respectively disengaging the locking structure 140 from the rack 128 and the down catch finger 142 from one aperture 133. Accordingly, the latch 126 can be turned to the unlocking state, and the headrest 104 can be adjusted upward or downward relative to the backrest portion 112 to suit a child's height.

When the headrest 104 is adjusted upward, the interaction between the adjusting parts 146 and the guiding rails 147A can cause the adjusting parts 146 to slide transversally opposite to each other. As a result, the shoulder straps 106A can be adjusted away from each other to suit a child of a larger and wider body size. In contrast, when the headrest 104 is adjusted downward, the adjusting parts 146 can slide transversally toward each other, whereby the transversal distance between the shoulder straps 106A can be reduced to suit a child of a smaller body size.

Once the headrest 104 is adjusted to a desirable height, the spring 153 can bias the actuator stem 150 to move upward so as to drive the latch 126 to rotate reversely so that the down catch finger 142 can engage with one corresponding aperture 133 to block downward travel of the headrest 104, and the locking structure 140 of the latch 126 can engage with an associated pair of the grooves 132 to lock the headrest 104 with the backrest portion 112. The engagement of the down catch finger 142 may occur slightly before the locking structure 140 entirely engages with the grooves 132 so as to first block downward displacement of the headrest 104, which can facilitate and permit accurate engagement of the locking structure 140 into the grooves 132.

Referring again to FIG. 1, the restraint harness 106 can include multiple harness straps, e.g., shoulder straps 106A, waist straps 106B, a crotch strap 106C, and a buckle 154 connected with the crotch strap 106C and operable to attach the shoulder straps 106A, the waist straps 106B and the crotch strap 106C together. The waist straps 106B can be passed through left and right side slits 156 provided on the seat portion 110. The shoulder straps 106A can be affixed with the seat shell 102, can be routed along the backrest portion 112, and extend forward from the front surface 116 of the backrest portion 112 at a region below the head support 120.

In conjunction with FIGS. 2, 3 and 5, FIGS. 7 and 7A are schematic views illustrating how the shoulder strap 106A can be routed through the seat sell 102. The backrest portion 112 can include a transversal bar 158 affixed in an interior of the backrest portion 112 near its top end 120. After assembly of the headrest 104 and latch 126 with the backrest portion 112 of the seat shell 102, the bar 158, the pivot axis X, the slits 144 and the locking structure 140 of the latch 126 can be respectively disposed vertically in this order from top to bottom.

Figure 7:
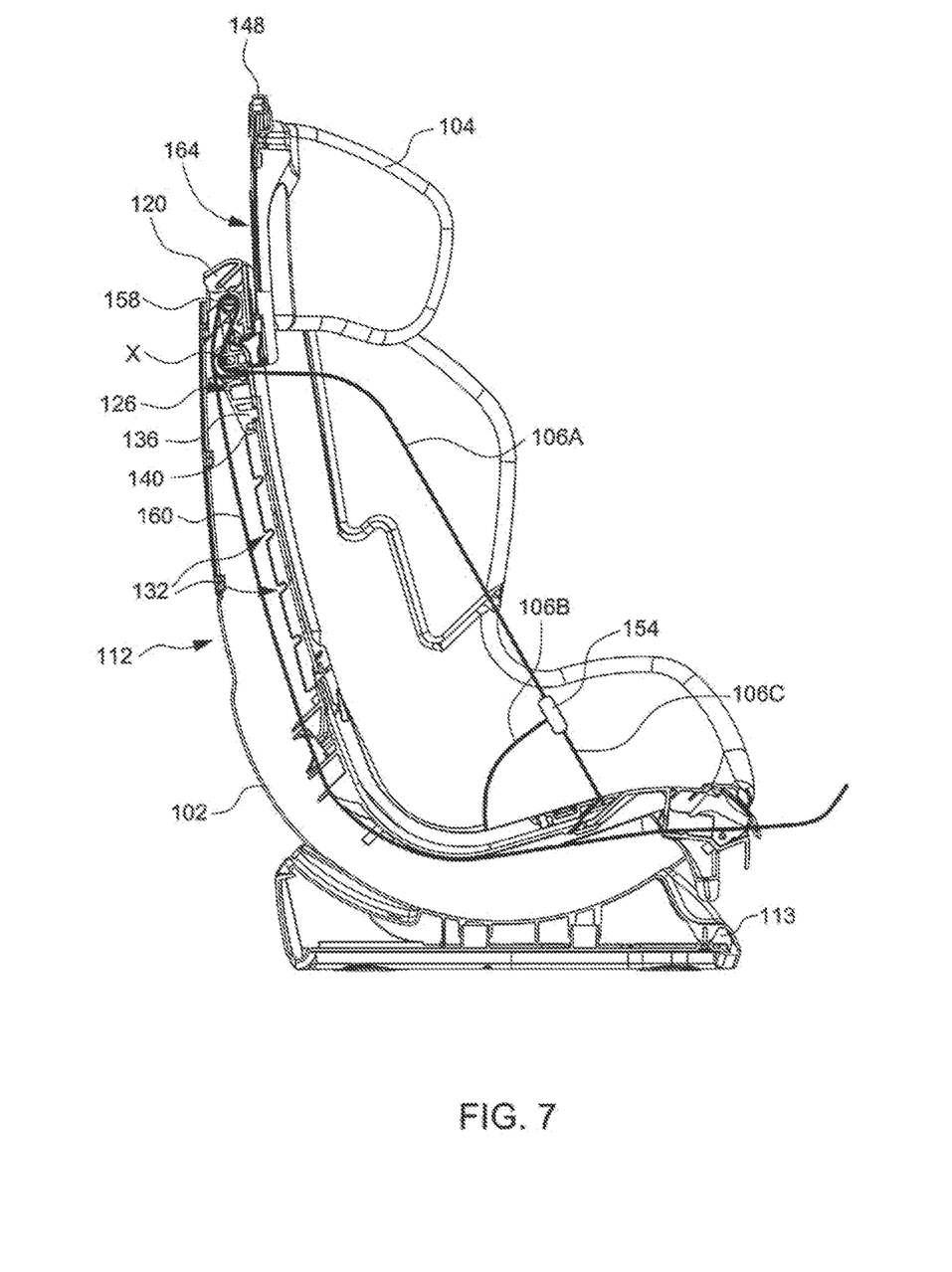
FIG. 7 is a cross-sectional view illustrating how a shoulder strap is routed through the seat sell.
Figure 7A:
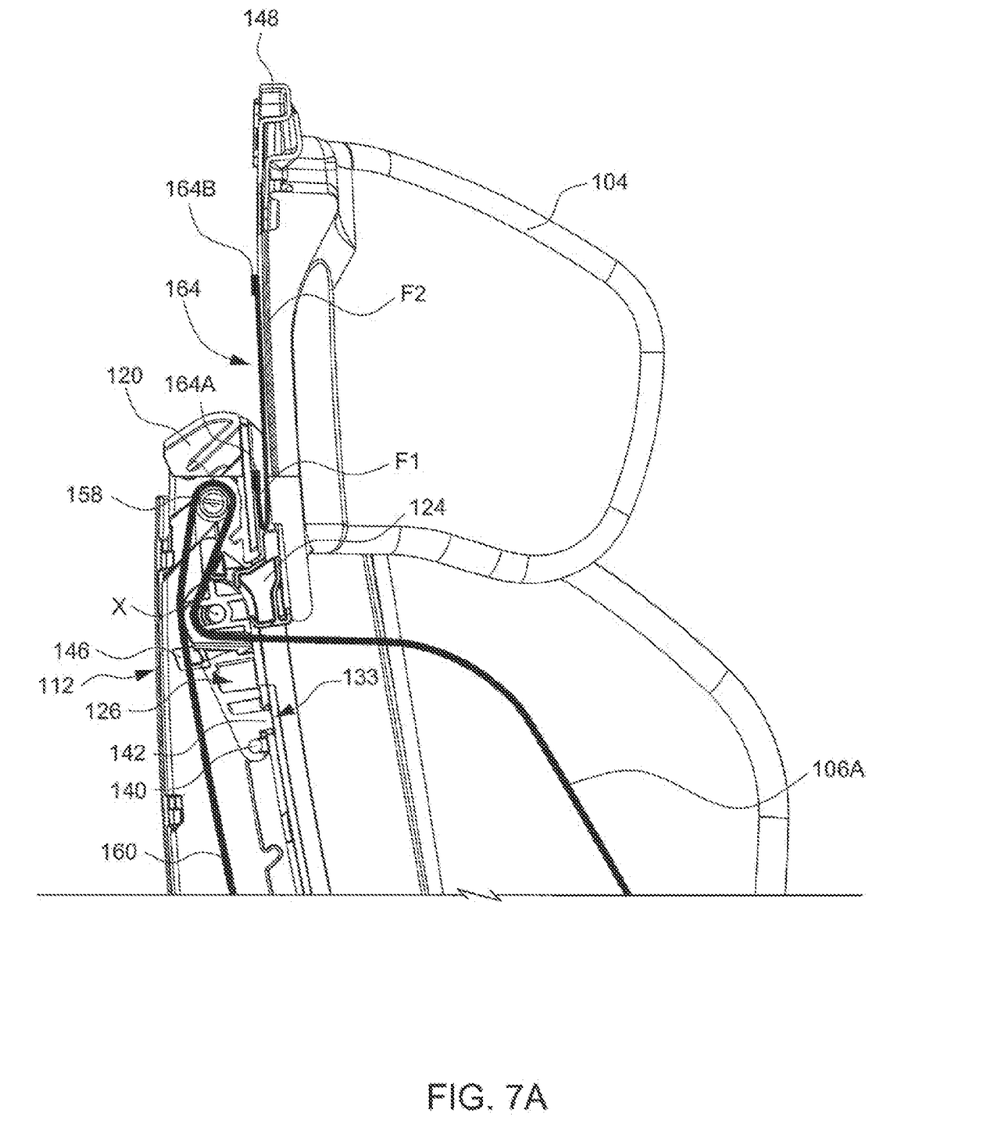
FIG. 7A is a schematic enlarged view of a portion of FIG. 6 more particularly showing the assembly of the headrest with the backrest portion.

Each shoulder strap 106A can be formed from a continuous webbing material 160 that can extend through an interior of the seat portion 110 from the front toward the rear, and then extend upward along the interior of the backrest portion 112. At an upper region of the backrest portion 112, the webbing material 160 can wrap around the bar 158 and then travel downward past the pivot axis X of the latch 126. The webbing material 160 then can pass from a rear to a front of the latch 126 through one associated adjusting part 146 and slit 144 of the plate 136, travel through one corresponding slot 118 of the backrest portion 112, and then extend at a front side of the backrest portion 112 below the headrest support 120.

The relative vertical positions of the bar 158, the pivot axis X, the slits 144 and the locking structure 140 of the latch 126 can facilitate the operation of the latch 126. In particular, because the webbing materials 160 of the shoulder straps 106A can pass through the slits 144 of the latch 126 vertically below the bar 158 and the pivot axis X, the shoulder straps 106A can bias the latch 126 into a locking position with the locking structure 140 engaged with the rack 128. Moreover, since the locking structure 140 of the latch 126 is located vertically below the slits 144, the webbing material 160 of the shoulder straps 106A does not interfere with the actuation of the latch 126 for disengaging the locking structure 140 from the rack 128.

Referring again to FIGS. 1, 7 and 7A, a panel 164 can be connected with the seat shell 102, and can be operable to cover a region of the backrest portion 112 that may become exposed at the front surface 116 owing to adjustment of the headrest 104. In one embodiment, the panel 164 can have a first end portion 164A connected with the backrest portion 112 of the seat shell 102 at a location above the upper rim edges 118A of the slots 118, and a second end portion 164B connected with the headrest 104. The panel 164 can be made of a flexible material that is folded over itself so as to define at least two portions F1 and F2 facing each other. Examples of suitable materials for the panel 164 can include a fabric material, a flexible structure made from the assembly of multiple slats, flexible sheets made of plastic materials, and the like.

Figure 8:
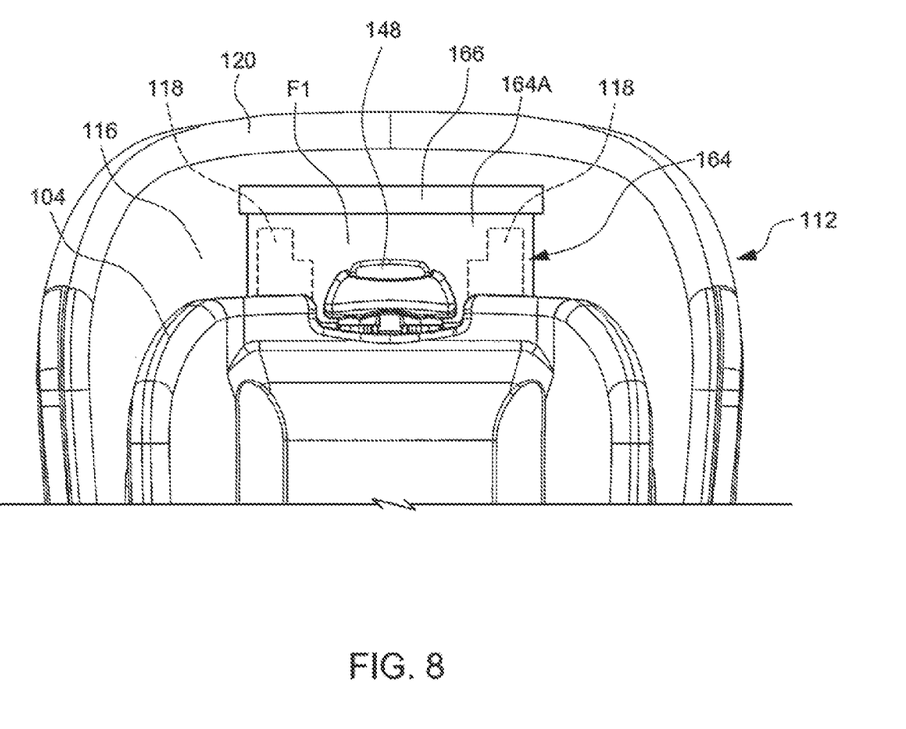
FIG. 8 is a schematic view illustrating an embodiment of a child safety seat provided with a winding drum operatively connected with a panel adapted to cover a region of the backrest portion.
Figure 9:
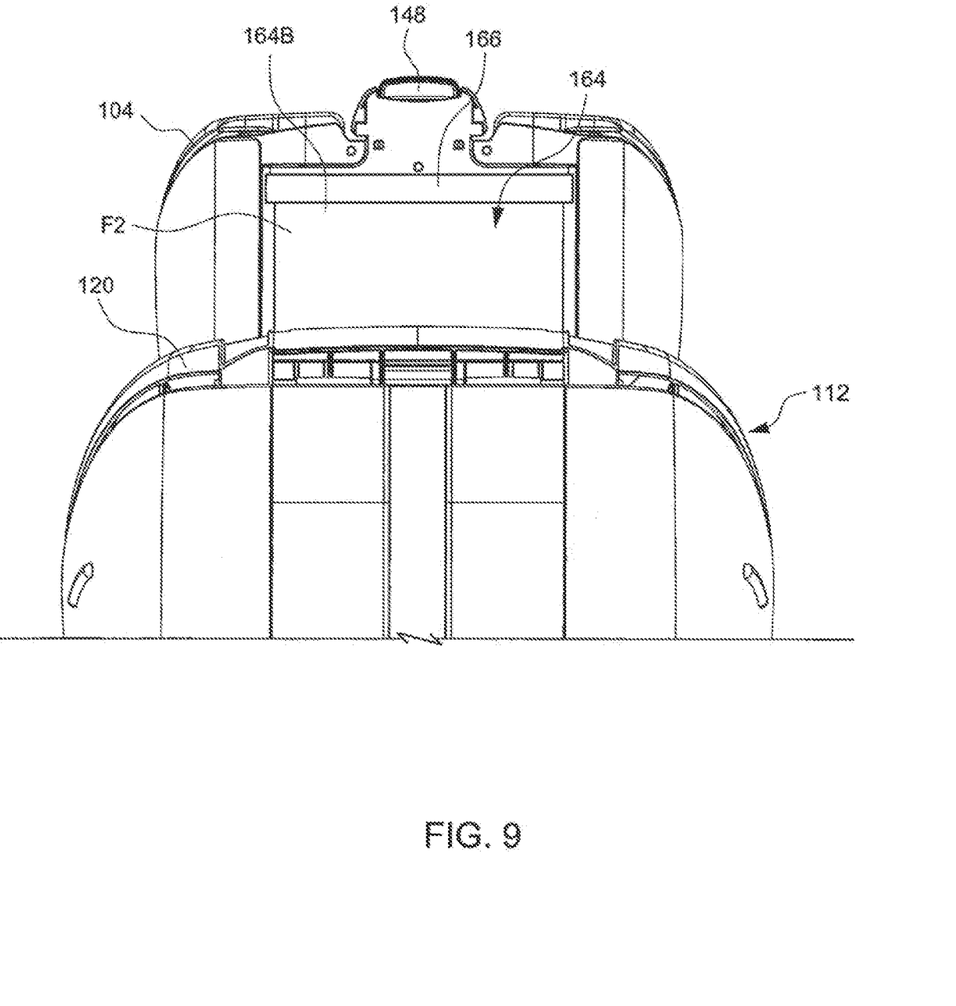
FIG. 9 is a schematic view illustrating another embodiment of a child safety seat provided with a winding drum operatively connected with a panel adapted to cover a region of the backrest portion

FIG. 8 is a schematic view illustrating another embodiment of a child safety seat 100 that may be provided with a winding drum 166 operatively connected with the panel 164. The spring-biased winding drum 166 can be provided for absorbing a slack of the panel 164 that can be formed when the headrest 104 is adjusted. As shown in FIG. 8, the winding drum 166 can be exemplary assembled with the seat shell 102 near the top end 120 of the backrest portion 112, and can connect with the first end portion 164A of the panel 164. In another embodiment shown in FIG. 9, the winding drum 166 may also be installed on the headrest 104, and connect with the second end portion 164B of the panel 164. The winding drum 166 can at least wind partially the panel 164 so as to keep the panel 164 suitably tensioned when the headrest 104 is movably adjusted relative to the backrest portion 112. For example, the panel 164 can unwind from the winding drum 164 as the headrest moves up or down away from a middle position, and the winding drum 166 can wind a slack of the panel 164 that can be formed as the headrest 104 moves from an upward or downward position toward the middle position. The panel 164 can thereby cover and conceal an exposed region of the front surface 116 that varies in size as the headrest 104 is adjusted relative to the backrest portion 112.

Referring to FIGS. 1 and 8, the panel 164 can more specifically cover a region encompassing portions of the slots 118 (shown with dotted lines) that is uncovered by the headrest 104 at the front surface 116 of the backrest portion 112 (which can include the upper rim edge 118A of each slot 118). As the second end portion 164B of the panel 164 moves upward with the headrest 104 relative to the backrest portion 112, the first portion F1 of the folded panel 164 adjacent to the first end portion 164A can progressively decrease in size, whereas the second portion F2 of the folded panel 164 adjacent to the second end portion 164B can progressively increase in size. In contrast, when the second end portion 164B of the panel 164 moves downward along with the headrest 104 relative to the backrest portion 112, the first portion F1 of the folded panel 164 adjacent to the first end portion 164A can increase in size, whereas the second portion F2 of the folded panel 164 adjacent to the second end portion 164B can decrease in size.

Referring to FIG. 8, when the headrest 104 is located at a position that is lower relative to the top end 120 of the backrest portion 112, the panel 164 can cover a region of the backrest portion 112 and the slots 118 located above the headrest 104, which can be accordingly concealed from the front side of the backrest portion 112.

When the headrest 104 is adjusted from the lowermost position toward the top end 120 of the backrest portion 112, the first portion F1 of the folded panel 164 can progressively decrease in size, the second portion F2 of the folded panel 164 can progressively increase in size, and the region of the slots 118 that is located above the headrest 104 and covered by the first portion F1 of the panel 164 can gradually decrease.

Figure 10:
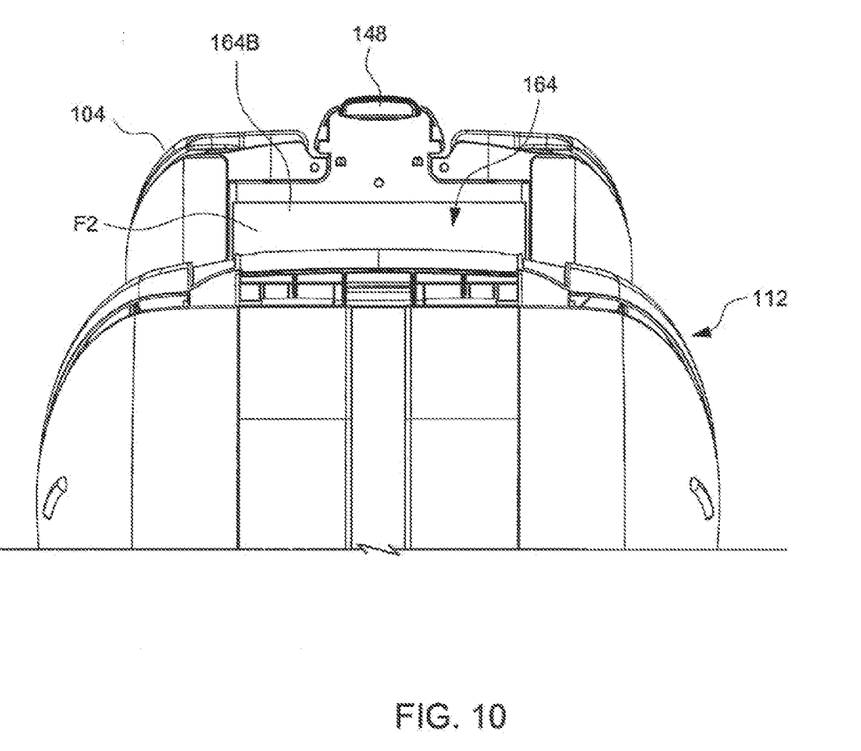
FIG. 10 is a schematic view illustrating upward adjustment of the headrest.

Referring to FIG. 10, as the headrest 104 moves further upward past the top end 120 of the backrest portion 112, the second portion F2 of the panel 164 can become visible from the rear of the backrest portion 112. When the headrest 104 reaches the uppermost position, the second portion F2 can be substantially stretched out and visible from the rear of the backrest portion 112.

Figure 11:
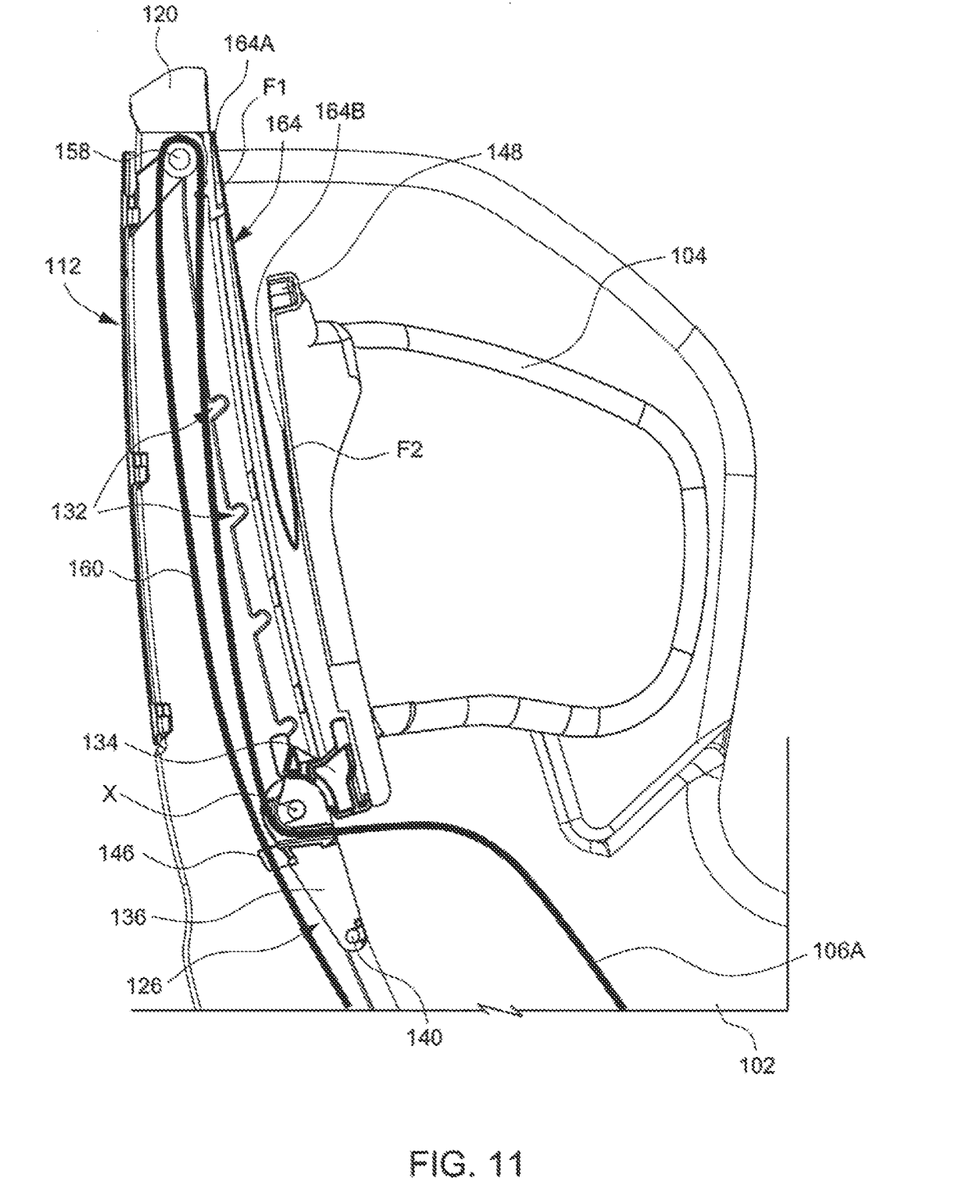
FIG. 11 is a schematic view illustrating the headrest adjusted to a lowermost position below a top end of the backrest portion.

When the headrest 104 is adjusted downward past the top end 120 of the backrest portion 112, more of the slots 118 can progressively become exposed above the headrest 104, and the first portion F1 of the folded panel 164 can increase in size to cover the exposed region of the slots 118, whereas the second portion F2 of the folded panel 164 can progressively decrease in size. Accordingly, the panel 164 can effectively cover and conceal certain structural features of the backrest portion 112 that would otherwise become exposed and visible. As shown in FIG. 11, when the headrest 104 reaches the lowermost position, the first portion F1 can be stretched out and visible from the front of the backrest portion 112. As a result, the outer appearance and the safety of the child safety seat can be improved.

Figure 12:
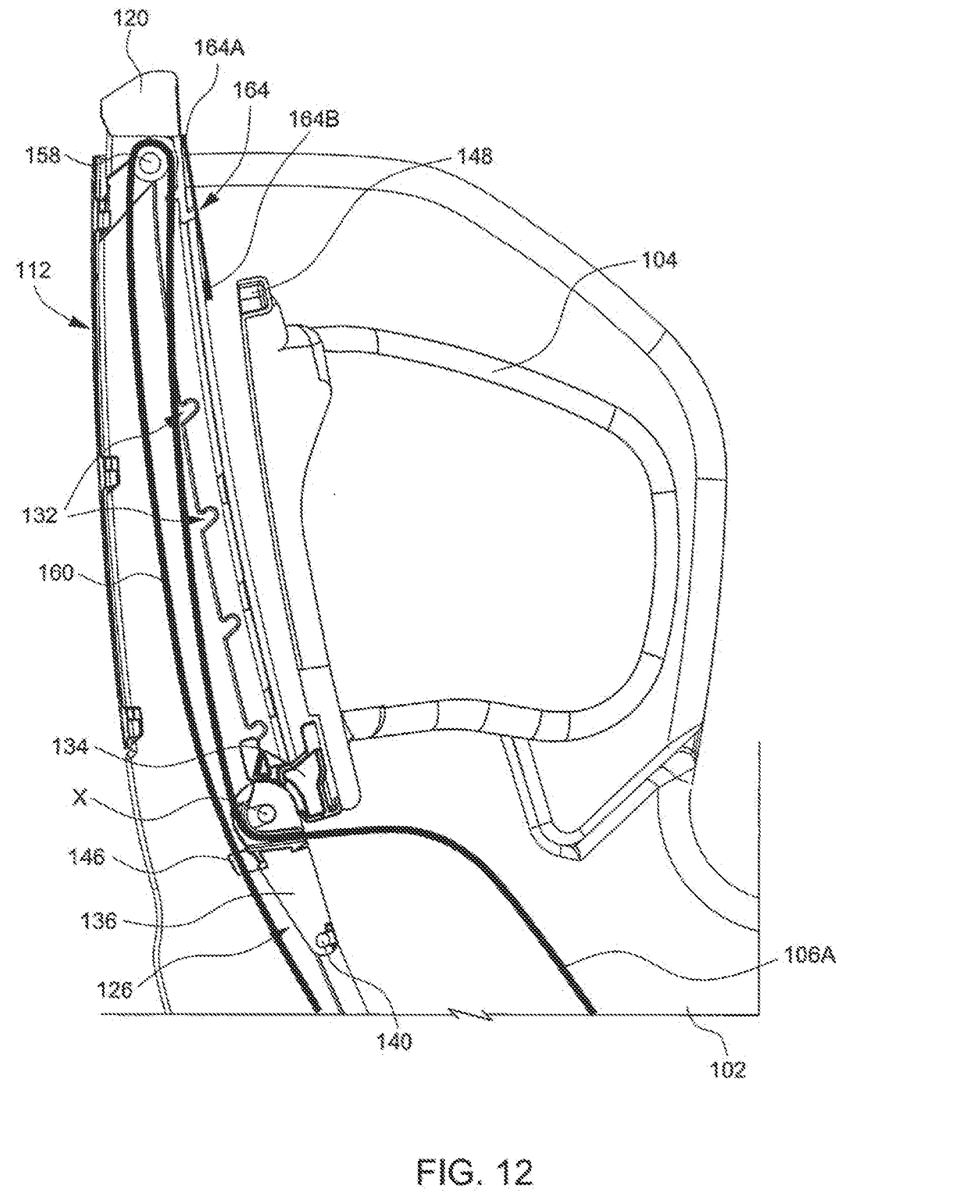
FIG. 12 is a schematic view illustrating another example for assembling a panel at a front surface of the backrest portion.

It will be appreciated that other assembly methods for the panel 164 may also be suitable. FIG. 12 is a schematic view illustrating another example in which the panel 164 may be affixed at the front surface 116 of the backrest portion 112 to cover at least an upper portion of the slots 118. For example, the panel 164 can be attached to a soft goods, which is in turn attached to the seat shell 102. The panel 164 can cover and conceal the upper portion of the slots 118 that may otherwise become uncovered on the front surface 116 when the headrest 104 is adjusted to lower positions below the top end 120 of the backrest portion 112.

At least one advantage of the structures described herein is the ability to provide a headrest that can be conveniently adjusted relative to the backrest portion of the seat shell to suit a child's size. Moreover, a panel operatively connected with the seat shell and the headrest can act to cover and conceal a region of the backrest portion that may become exposed at the front surface of the backrest portion as a result of the headrest being adjusted. The region covered by the panel can include portions of the slots through which the shoulder straps are routed to a front side of the backrest portion. Concealment of these structural features can improve the outer appearance of the child safety seat, and limit access thereto, which can prevent accidental injuries in use.

Realizations of the child safety seat have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope as defined in the claims that follow.

What is claimed is:

1. A child safety seat comprising:
    a seat shell having a backrest portion, the backrest portion having a front surface, and a slot opened on the front surface;
    a headrest adjustable along the front surface of the backrest portion;
    a shoulder strap assembled with the seat shell, the shoulder strap being defined from a webbing material that passes through the slot and extends at a front side of the backrest portion; and
    a panel assembled at the front surface, the panel being configured to cover a region on the front surface of the backrest portion that extends above the headrest when the headrest is adjusted downward.

2. The child safety seat according to claim 1, wherein the slot has an upper rim edge, and the region covered with the panel includes the upper rim edge.

3. The child safety seat according to claim 1, wherein the region of the backrest portion covered with the panel includes a portion of the slot located above the headrest.

4. The child safety seat according to claim 1, wherein the region that is covered by the panel is gradually reduced as the headrest is adjusted from a lowermost position toward a top end of the backrest portion.

5. The child safety seat according to claim 1, wherein the panel has a first end portion connected with the seat shell, and a second end portion connected with the headrest.

6. The child safety seat according to claim 5, wherein the panel is made of a flexible material that is folded over itself.

7. The child safety seat according to claim 5, wherein the panel is made of a flexible material, and the headrest is provided with a winding drum to which is connected the second end portion of the panel, the winding drum being operable to wind at least partially the panel to keep the panel adequately tensioned when the headrest moves relative to the backrest portion.

8. The child safety seat according to claim 1, wherein the seat shell is provided with a winding drum, and the panel is made of a flexible material having an end portion connected with the winding drum, the winding drum being operable to wind a slack of the panel to keep the panel adequately tensioned when the headrest moves relative to the backrest portion.

9. The child safety seat according to claim 1, wherein the panel is made of a fabric material.

10. The child safety seat according to claim 1, wherein the webbing material is routed through the backrest portion, and wraps around a shaft that is affixed with the backrest portion at a location above the slot.

11. The child safety seat according to claim 1, wherein the headrest includes a latch movable along with the headrest and biased to engage with the backrest portion to hold the headrest in place relative to the backrest portion, the webbing material passing through the latch.

12. A child safety seat comprising:
    a seat shell having a backrest portion, the backrest portion having a front surface, and a slot opened on the front surface;
    a headrest adjustable along the front surface of the backrest portion;
    a shoulder strap assembled with the seat shell, the shoulder strap being defined from a webbing material that passes through the slot and extends at a front side of the backrest portion; and
    a panel assembled at the front surface, the panel covering a portion of the slot that extends above the headrest as the headrest is adjusted relative to the backrest portion.

13. The child safety seat according to claim 12, wherein the panel has a first end portion connected with the seat shell, and a second end portion connected with the headrest.

14. The child safety seat according to claim 13, wherein the panel is made of a flexible material that is folded over itself.

15. The child safety seat according to claim 13, wherein the panel is made of a flexible material, and the headrest is provided with a winding drum to which is connected the second end portion of the panel, the winding drum being operable to wind at least partially the panel to keep the panel adequately tensioned when the headrest moves relative to the backrest portion.

16. The child safety seat according to claim 12, wherein the seat shell is provided with a winding drum, and the panel is made of a flexible material having an end portion connected with the winding drum, the winding drum being operable to wind a slack of the panel to keep the panel adequately tensioned when the headrest moves relative to the backrest portion.

17. The child safety seat according to claim 12, wherein the panel is made of a fabric material.

18. The child safety seat according to claim 12, wherein the headrest includes a latch movable along with the headrest and biased to engage with the backrest portion to hold the headrest in place relative to the backrest portion, the webbing material passing through the latch.

19. A child safety seat comprising:
- a seat shell having a backrest portion, the backrest portion having a front surface, a slot opened on the front surface, and a transversal bar affixed with the backrest portion;
- a headrest adjustable along the front surface of the backrest portion;
- a latch assembled with the headrest at a position vertically below the transversal bar, wherein the latch has a locking structure operable to engage with the backrest portion to hold the headrest in place, and the latch is assembled with the headrest about a pivot axis that is located between the transversal bar and the locking structure, the latch further including a slit located between the pivot axis and the locking structure; and
- a webbing material assembled with the seat shell, wherein the webbing material wraps around the transversal bar, is routed through the slit of the latch, passes through the slot and extends at a front side of the backrest portion.

20. The child safety seat according to claim 19, wherein the webbing material forms a shoulder strap.

21. The child safety seat according to claim 19, further including an adjusting part movably assembled with the latch adjacent to the slit, the webbing material passing through the adjusting part and the slit, and the adjusting part being movable along a length of the slit to modify a transversal position of the shoulder strap relative to the backrest portion.

22. The child safety seat according to claim 19, wherein the webbing material extending downward from the transversal bar wraps around a portion of the latch adjacent to the pivot axis, and passes through the latch and the slot to extend at the front side of the backrest portion.

23. The child safety seat according to claim 19, further including a panel connected with the seat shell, when the headrest is adjusted to a position that is lower relative to a top end of the backrest portion, the panel covering a region of the backrest portion extending between the headrest and the top end of the backrest portion.

24. The child safety seat according to claim 19, wherein the latch includes a catch finger and a locking structure respectively configured to engage with the backrest at two spaced-apart locations, when the latch is turning to a locking state, the catch finger first engages with the backrest to prevent downward displacement of the headrest, and the locking structure subsequently completes its engagement with the backrest.

* * * * *